United States Patent [19]

Ming et al.

[11] Patent Number: 5,451,242

[45] Date of Patent: Sep. 19, 1995

[54] ACTIVE SYNTHETIC SOIL

[75] Inventors: Douglas W. Ming; Donald L. Henninger, both of Houston, Tex.; Earl R. Allen, Stillwater, Okla.; Dadigamuwage C. Golden, Houston, Tex.

[73] Assignee: The United States of America as represented by the Administrator of the National Aeronautics and Space Administration, Washington, D.C.

[21] Appl. No.: 243,336

[22] Filed: May 2, 1994

Related U.S. Application Data

[63] Continuation of Ser. No. 963,349, Oct. 16, 1992, abandoned.

[51] Int. Cl.$^6$ .............. C05B 7/00; C01B 15/16; B01J 29/06
[52] U.S. Cl. ........................ 71/36; 71/51; 71/53; 71/61; 71/63; 71/64.11; 71/903; 71/904; 423/311; 502/64
[58] Field of Search ............ 71/36, 53, 61, 63; 423/308, 311; 502/64; 471/64.11, 903, 904

[56] References Cited

U.S. PATENT DOCUMENTS

| | | | |
|---|---|---|---|
| 2,211,918 | 8/1940 | Turrentine | 71/53 |
| 3,958,973 | 5/1976 | Roberts | 71/64.1 |
| 4,139,599 | 2/1979 | Tomlinson et al. | 423/308 |
| 4,175,943 | 11/1979 | Jordaan et al. | 71/29 |
| 4,299,613 | 11/1981 | Carderelli | 71/64.11 |
| 4,321,078 | 3/1982 | Michaud | 71/53 |
| 4,334,906 | 6/1982 | Young | 71/33 |
| 4,337,078 | 6/1982 | Petrov et al. | 71/24 |
| 4,363,650 | 12/1982 | Glasser et al. | 71/36 |
| 4,402,725 | 9/1983 | Heller et al. | 71/27 |
| 4,507,139 | 3/1985 | Sullivan et al. | 71/50 |
| 4,557,749 | 12/1985 | Berthet et al. | 71/64.11 |
| 4,670,039 | 6/1987 | Sjogren | 71/34 |
| 4,711,769 | 12/1987 | Inoue et al. | 423/308 |
| 4,836,994 | 6/1994 | Inoue et al. | 423/308 |
| 4,994,100 | 2/1991 | Sutton et al. | 71/30 |
| 4,995,897 | 2/1991 | Schramm et al. | 71/64.11 |
| 5,037,470 | 8/1991 | Matzen | 71/53 |
| 5,106,405 | 4/1992 | Goto | 71/7 |

OTHER PUBLICATIONS

Barbarick et al., "Response of Sorghum–Sudangrass in Soils Amended with Prosphate Rock and NH$_4$–Exchanged Zeolite," Technical Bulletin, Colorado State Univ., Jun. 1988.

Casey et al., "Leaching of Mineral and Glass Surfaces During Dissolution," *Reviews in Mineralogy*, Hochella, Jr. et al editors, vol. 23, pp. 397–426 (1990) No Month.

Chesworth et al., "Solubility of Apatite in Clay and Zeolite Bearing Systems: Application to Agriculture," Applied Clay Sciences, vol. 2, pp. 291–297 (1987) No Month.

Golden, "Synthetic Micronutrient–Substituted Apatites as Direct Application Fertilizers," Agronomy Abstracts, 1991 Annual Meeting, Oct. 27–Nov. 1, p. 365(1991) No Month.

Ming, "Fertilization of Mineral Dissolution and Ion Exchange," *Agronomy Abstracts, 1991, Annual Meeting*, Oct 27–Nov. 1, p. 367 (1991).

Ming et al., Space 92: The Third International Coference on Engineering, Construction and Operations in Space, Sadeh et al., editors, pp. 1709–1719 (1992). No Month.

(List continued on next page.)

*Primary Examiner*—Ferris Lander
*Attorney, Agent, or Firm*—Hardie R. Barr; Guy M. Miller; Edward K. Fein

[57] ABSTRACT

A synthetic soil/fertilizer for horticultural application having all the agronutrients essential for plant growth is disclosed. The soil comprises a synthetic apatite fertilizer having sulfur, magnesium and micronutrients dispersed in a calcium phosphate matrix, a zeolite cation exchange medium saturated with a charge of potassium and nitrogen cations, and an optional pH buffer. Moisture dissolves the apatite and mobilizes the nutrient elements from the apatite matrix and the zeolite charge sites.

38 Claims, 1 Drawing Sheet

OTHER PUBLICATIONS

Resseler et al., "Preparation and use of $^{33}$P Labelled Carbonate Fluoroapatite in Studies on the Effect of Phosphate Rock Containing Fertilizers," *Z. Pflanzernernahr, Bodenk.*, 152:325–332 (1989) No Month.

Smith et al., "An X-Ray Investigation of Carbonate Apatites," *Journal of Agricultural Food Chemicals*, pp. 342–349 (1966) No Month.

Van Vlack, *Elements of Materials Science*, Second Edition, pp. 74–79 (1966) No Month.

CA105(12):99955m., Inoue et al, Calcium–Phosphorus Type Apotite Dec. 18, 1984.

Caro et al., *Journal of Agriculture Food Chemistry*, 4:684–687, 1956. No Month.

McClelan et al., *American Mineralogist*, 54:1374–1391., Sep. 1969.

Ming et al., "Fertilization by Mineral dissolution and Ion–Exchange," *Agronomy Abstracts*, Soil Science Division, Oct. 27–Nov. 1, 1991.

Resseler et al., *Fertilizer Research*, 20:135–143. 1989 No Month.

Ming, *Lunar Base Agriculture: Soils for Plant Growth*, Madison Wis.:ASA–CSSA–SSSA, pp. 93–105, 1989. No Month.

MacKown et al., *Soil Science Society American Journal*, 49:235–238, 1985. No Month.

Pirella et al., *Zeo–Agriculture: Use of Natural Zeolites in Agriculture and Aquaculture*, Pond et al., (ed.) Boulder Colo.: Westview Press, 1983.

Ferguson et al., *Soil Science Society American Journal*, 51:231–234, 1987. No Month.

Allen et al., *Agronomy Abstracts*, Soil Science Division S-2—Soil Chemistry, Nov. 27–Dec. 2, 1988.

Parham, *Zeo–Agriculture: Use of natural Zeolites in Agriculture and Aquaculture*, Pond et al., (ed.) Boulder Colo.: Westview Press, 1983. No Month.

Lewis et al., *Zeo–Agriculture: Use of Natural Zeolites in Agriculture and Aquaculture*, Pond et al., (ed.) Boulder Colo.: Westview Press, 1983. No Month.

Chesworth et al., *Applied Clay Science*, 2:291–297, 1987. No Month.

Barbarick et al., *Colorado State University Technical Bulletin*, TB88-1, 1988. No Month.

Iskenderov et al., *Occurance, Properties and Utilization of Natural Zeolites*, Kallo' et al., (ed.), Budapest: Akademiai Kiado, pp. 717–720, 1988. No Month.

Ferguson et al., *Agronomy Journal*, 78:1095–1098, 1986. No Month.

Lai et al., *Zeolites* 6:129–132, 1986. No Month.

Hersey et al., *Horticulture Science*, 15:87–89, 1980. No Month.

Weber, *Journal of Environmental Quality* 12:549–552, 1983. No Month.

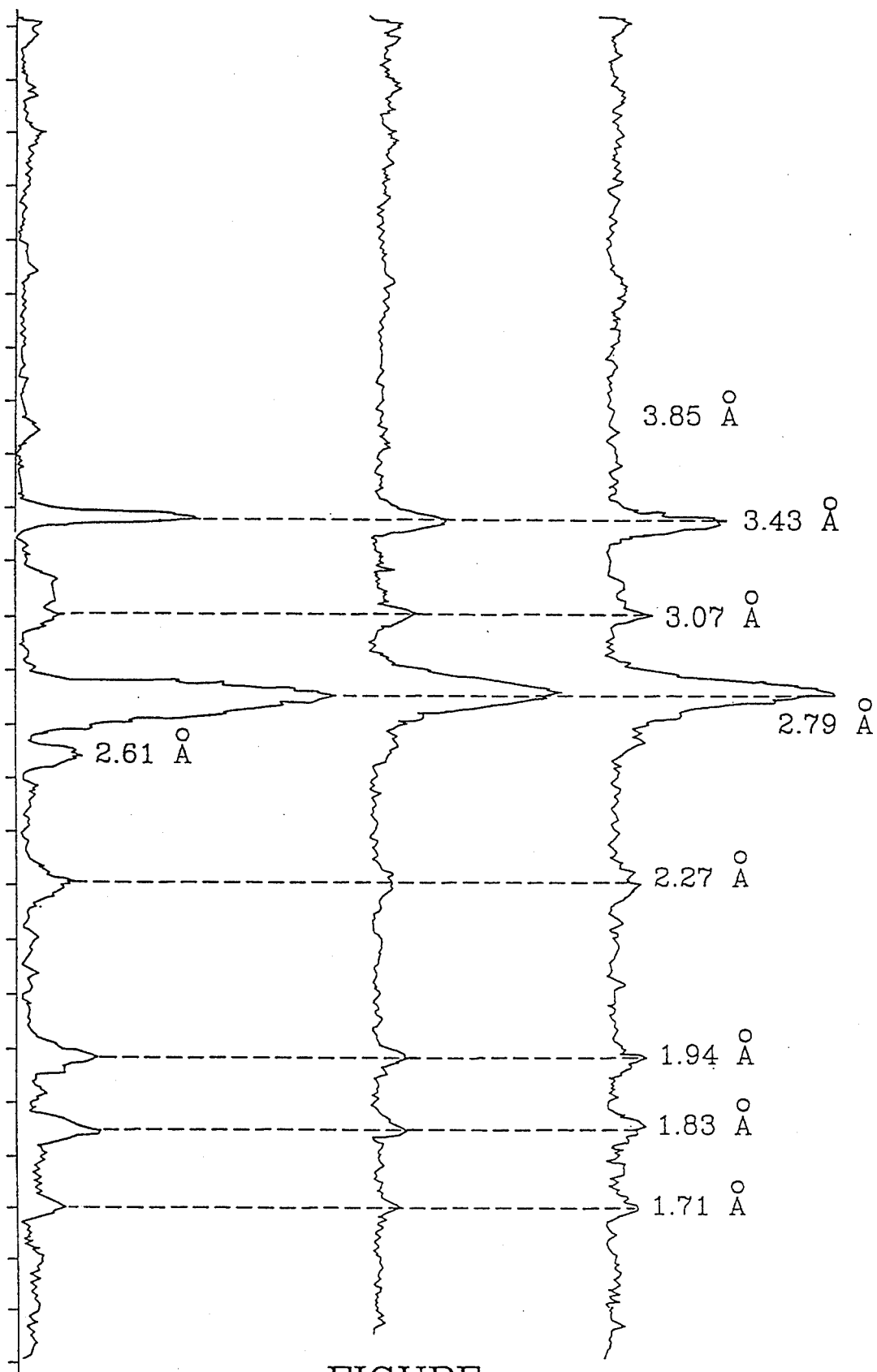
FIGURE

ACTIVE SYNTHETIC SOIL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS-REFERENCE TO RELATED APPLICATION

This is a continuation of our earlier application Ser. No. 963,349, Oct. 16, 1992, abandoned.

FIELD OF THE INVENTION

The present invention relates to an active synthetic soil for horticulture. More particularly the present invention relates to an active synthetic soil made from synthetic apatite and natural zeolite having a complete spectrum of agronutrients necessary for plant growth.

BACKGROUND OF THE INVENTION

Synthetic soils for horticulture (i. e., solid substrates for plant support) include two general categories—inert and active. Inert substrates are commonly used in nutriculture (e. g., hydroponics) and are designed to provide mechanical support, proper root aeration and drainage. Quartz sand is a good example of an inert soil. Plant nutrients are added separately as, for example, liquid fertilizers such as Hoagland's solution. Soils which are defined as "active" have the ability to provide nutrient retention and release (i. e., incorporate fertilizing capability) in addition to the other primary soil functions of the above mentioned inert soils.

It is known that nutrient retaining activity in natural soils is due to the presence of organic matter and clay components. Such components have charge sites suitable for ion exchange. Prior to release, the nutrient elements are held at the charge sites as "exchange ions." Recent introduction of ion exchange media (that are not normally found in natural soils) having a high exchange ion holding capacity have made feasible the development of active synthetic soil-fertilizers which can supply plant nutrients over a long period of time.

Mineral zeolites have been found to be a class of very useful ion exchange media. Many natural species are prevalent and numerous synthetic species have been made in the laboratory. Zeolites are hydrated aluminosilicates of alkali and alkaline-earth cations that possess infinite, three-dimensional crystal structures (i.e., tektosilicates). The primary building units of the zeolite crystal structure are $(Al,Si)O_4$ tetrahedra. When $Al^{3+}$ and sometimes $Fe^{3+}$ substitute for $Si^{4+}$ in the central cation position of the tetrahedron, a net-negative charge is generated. This negative charge is counterbalanced primarily by monovalent and divalent "exchange cations." Zeolites have shown the ability to exchange most of their constituent exchange cations as well as hydrate/dehydrate without major changes in the structural framework. Most zeolites have large channels and/or cages that allow exchange cations easy access to charge sites and provide unique cation selectivity.

The use of zeolites as a major soil component has a relatively recent past. U.S. Pat. No. 4,337,078 to Petrov et al. describes the use of a natural zeolite clinoptilolite with vermiculite and peat in a synthetic soil. The term zeoponics has been coined to describe synthetic soils containing zeolites in horticulture.

Agronomists and botanists have long recognized the vital function of sixteen nutrients needed by growing plants including the trace elements or micronutrients—zinc, chlorine, iron, manganese, copper, molybdenum and boron. It is also known that the optimal spectrum and concentration of micronutrients in a particular soil can vary depending on the plants being grown, soil properties, climate, and the stage of the plant growth cycle.

While most natural soils contain micronutrients at least to some extent and the overall need is small, depletion can occur with intensive agricultural activity. Even when the soil concentration is putatively adequate, other factors can prevent micronutrient uptake by the plant. Since micronutrients must be available as soluble ions, such ions can be immobilized in low solubility alkaline soils and/or can be trapped on clays or organic materials as insoluble complexes.

It has been common practice to supplement phosphorus-impoverished soil by using a mineral fertilizers such as rock phosphate or natural apatite Such minerals, however, do not supply the required micronutrients and can contain toxic elements such as fluorine and cadmium.

Rock phosphate as mined is relatively insoluble in water. Therefore, the raw product is generally pretreated to enhance phosphate solubility prior to use. Such processes, however, are considered too expensive for farmers in underdeveloped nations. Yet, fertilizer use is necessary to promote economic development. It has been suggested by Chesworth et al., *Applied Clay Science*, 2:291–297, 1987, Barbarick et al., Colorado State University Department of Agronomy Technical Bulletin No. TB88-1, June 1988 and Lai et al., *Zeolites*, 6:129–132, 1986 that a combination of natural untreated rock phosphate and an ion exchange medium such as a zeolite, which are both relatively abundant in underdeveloped regions of the world, can be made to increase the solubility of rock phosphate in the soil without pretreatment. The zeolite is thought to act as a sink for calcium cations and induce further dissolution of the rock phosphate.

Agriculture at lunar colonies will require development of artificial soils and fertilizers which perform the four primary functions of a natural soil (e. g., nutrient retention, aeration, moisture retention and mechanical support). It is also desirable that such artificial soils be manufactured substantially from lunar resources, provide an entire spectrum of essential nutrient elements and be substantially free of toxic elements.

Ming D. W., *Lunar Base Agriculture Soils for Plant Growth*, (Ming and Henniger, ed.), American society of Agronomy, Madison, Wis., 1989, pp. 93–106 discusses the use of zeolites in the manufacture of synthetic soils on the moon.

Lewis M. D. et al., *Zeo-Agriculture: Use of Natural Zeolites in Agriculture and Aquaculture*, (Pond and Mumpton ed.), Boulder, Colo.:Westview Press, 1983, pp. 105–111, describes the use of granulated clinoptilolite, ammonium-exchanged clinoptilolite and urea as nitrogen fertilizers.

Pirela, D. G. et al., *Zeo-Agriculture: Use of Natural Zeolites in Agriculture and Aquaculture*, (Pond and Mumpton ed.), Boulder, Colo.:Westview Press, 1983, pp. 113–122, describes the use of clinoptilolite in combination with nitrogen fertilization to increase plant growth.

Parham, W. E., *Zeo-Agriculture: Use of Natural Zeolites in Agriculture and Aquaculture,* (Pond and Mumpton ed.), Boulder, Colo.:Westview Press, 1983, pp. 283-285, surveys the use of natural zeolites in the agricultural arts.

Ferguson et al., *Soil Science Society of America Journal,* 51:231-234, 1987 describes ammonium retention in sand amended with clinoptilolite.

Ferguson et al., *Agronomy Journal,* 78:1095-1098, Nov-Dec, 1987 describes the growth of creeping bentgrass on a clinoptilolite amended sand.

Iskenderov et al., *Occurance, Properties and Utilization of Natural Zeolites,* (Kalló and Sherry ed.), Budapest::Akadémiai Kiadó, 1988 pp. 717-720, describes the utilization of natural zeolite in Azerbaijan for increasing wheat yield.

MacKown et al., *Journal of American Soil Science Society,* 49:235-238, 1985 describes the mobilization of ammonium nitrogen in a coarse textured soil amended with zeolite.

Allen E. R. et al., *Agronomy Abstracts,* p. 193, Nov. 27-Dec. 2, 1988 describes use of a zeolite-apatite substrate to supply nitrogen, phosphorus and potassium by ion exchange.

U.S. Pat. No. 3,958,973 to Roberts describes a micronutrient metal containing phosphate glass for fertilizer use. The glass is based on $P_2O_5$ and the micronutrients are based on the metal oxide. A solubility control agent is said to be present to control the amount and rate of release.

U.S. Pat. No. 4,299,613 to Carderelli describes a polymeric composition incorporating essential plant growth compounds in ionic form. These compounds are said to be gradually, continuously and uniformly released over a long period of time in response to the presence of moisture.

U.S. Pat. No. 4,334,906 to Young describes a combination soil amendment and micronutrient source. The composition comprises highly porous sulfur particles having substantial internal surface area with the micronutrient source dispersed either throughout the particle matrix or over the interior surfaces.

U.S. Pat. No. 4,670,039 to Sjogren describes a controlled slow release fertilizer composition comprising an encapsulated fertilizer, carbon particles and plaster.

U.S. Pat. No. 4,557,749 to Berthet et al. describes a sealed container for a hydrosoluble fertilizer or agricultural product. The container has a wall made of a hydrophobic polymer diaphragm with hydrophilic inclusions which absorb water. Water passing into the container dissolves the fertilizer which is then desorbed into the medium being treated.

Other U.S. patents of interest include U.S. Pat. No. 4,994,100 to Sutton et al.; U.S. Pat. No. 4,507,139 to Sullivan et al.; U.S. Pat. No. 4,175,943 to Jordaan et al.; and U.S. Pat. No. 4,995,897 to Schramm et al.

SUMMARY OF THE INVENTION

The present invention provides a synthetic soil and fertilizer composition for horticulture which contains an entire spectrum of nutrients essential for plant growth. The soil combines a cation exchange medium charged with ammonium and potassium exchange cations and a synthetic apatite composition comprising magnesium, sulfur and plant micronutrients. The synthetic apatite unlike natural varieties is essentially free of toxic elements. The presence of moisture mobilizes the plant nutrients at a slow, steady rate. In addition, the nutrient release rate can be closely tailored to the horticultural requirements. These features and others offer potential for use in lunar agriculture applications.

In one embodiment, the present invention provides a slow-release fertilizer. The fertilizer is made from a synthetic apatite comprising matrix of calcium phosphate having a dispersion of one or more agronutrients and a cationic exchange medium having a charge of one or more agronutrients. The apatite and cationic exchange medium are preferably essentially free of agrotoxins, such as, for example, fluorine, cadmium and sodium, in amounts detrimental to the growth of most plants. Agronutrients include, for example, potassium, ammonium-nitrogen, magnesium, sulfur, zinc, chlorine, iron, manganese, copper, molybdenum and/or boron. The fertilizer can further include a pH buffer to maintain a pH balance of from about 5.5 to about 7. The cationic exchange medium can comprise natural or synthetic zeolite, phyllosilicate or a combination thereof including clinoptilolite, chabazite, mordenite, phillipsite, Linde type A, Linde type X, vermiculite, smectite or a combination thereof. The cation exchange medium has a cation exchange capacity (CEC) of at least 50 cmol$_c$/kg, preferably at least 100 cmol$_c$/kg, and more preferably at least 150 cmol$_c$/kg. The cation exchange medium preferably has a charge of ammonium and potassium ions at a weight ratio of from about 1 to about 5:1 of ammonium:potassium. The fertilizer preferably comprises from about 5 to about 100 parts by weight of the synthetic apatite per 100 parts by weight of the cationic exchange medium.

In a preferred embodiment, the apatite of the fertilizer has a generally uniform composition and corresponds to the formula:

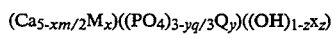

$$(Ca_{5-xm/2}M_x)((PO_4)_{3-yq/3}Q_y)((OH)_{1-z}X_z)$$

wherein M is a cation containing an element selected from potassium, zinc, iron, manganese, magnesium, copper or a combination thereof; wherein m is the molar average valence of M according to the equation $m=(\Sigma m_i x_i)/(\Sigma x_i)$ where each $m_i$ is the valence of ith cation comprising M and $x_i$ is the relative molar proportion of the ith cation; wherein Q is an anion of carbonate, silicate or containing an element selected from boron, molybdenum, or sulfur, or a combination thereof; wherein q is the molar average valence of Q according to the equation $q=(\Sigma q_i y_i)/(\Sigma y_i)$ where each $q_i$ is the valence of ith anion comprising Q and $y_i$ is the relative molar proportion of ith anion; wherein X is chloride, fluoride or a combination thereof; and wherein x has a value of 0–0.82, y has a value of 0–0.76, and z has a value of 0–0.15, provided that at least one of x and y are greater than zero and the amount of fluoride does not exceed 3000 ppm by weight, and also provided that when x is zero Q includes an anion of boron, molybdenum and/or sulfur. Preferably $M_x$ has the formula:

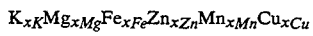

$$K_{xK}Mg_{xMg}Fe_{xFe}Zn_{xZn}Mn_{xMn}Cu_{xCu}$$

wherein $x_K \leq 0.205$; $x_{Mg} \leq 0.412$; $x_{Fe} \leq 0.144$; $x_{Zn} \leq 0.0123$; $x_{Mn} \leq 0.044$; $x_{Cu} \leq 0.0038$; $x = x_K + x_{Mg} + x_{Fe} + x_{Zn} + x_{Mn} + x_{Cu}$; and wherein $x > 0$. More preferably, $0.051 \leq x_K \leq 0.205$; $0.165 \leq x_{Mg} \leq 0.412$; $0.0359 \leq x_{Fe} \leq 0.144$; $0.006 \leq x_{Zn} \leq 0.0123$; $0.018 \leq x_{Mn} \leq 0.044$; and $0.0016 \leq x_{Cu} \leq 0.0038$. Especially, $0.102 \leq x_K \leq 0.154$; $0.247 \leq x_{Mg} \leq 0.33$; $0.072 \leq x_{Fe} \leq 0.108$; $0.0061 \leq x_{Zn} \leq 0.0092$;

$0.018 \leq x_{Mn} \leq 0.036$; and $0.0025 \leq x_{Cu} \leq 0.0032$. $Q_y$ preferably has the formula:

$$(CO_3)_{yC}(SiO_4)_{ySi}(MoO_4)_{yMo}(BO_3)_{yB}(SO_4)_{yS}$$

wherein $y_C$ has a value up to about 0.5, $y_{Si}$ has a value up to about 0.218, $y_{Mo}$ has a value up to about 0.000052, $y_B$ has a value up to about 0.0093, and $y_S$ has a value up to about 0.25; and wherein $y = y_C + y_{Si} + y_{Mo} + y_B + y_S$, and $(y_{Mo} + y_B + y_S) > 0$. More preferably, $0.00002 \leq y_{Mo} \leq 0.000042$; $0.00185 \leq y_B \leq 0.00741$; and $0.125 \leq y_S \leq 0.25$. Especially, $0.000021 \leq y_{Mo} \leq 0.0000313$; $0.0037 \leq y_B \leq 0.0056$; and $0.156 \leq y_S \leq 0.219$. Where the solubility control agent is carbonate, preferably $0.0668 \leq y_C \leq 0.334$, and especially $0.134 \leq y_C \leq 0.2$; and where it is silicate, preferably $0.0435 \leq y_{Si} \leq 0.131$, and especially $0.0653 \leq y_{Si} \leq 0.109$. $x_z$ preferably has the formula:

$$Cl_{zCl}F_{zF}$$

wherein $z_{Cl}$ has a value up to about 0.071, $z_F$ has a value less than about 0.08, and $z = z_{Cl} + z_F$. More preferably, $0.0283 \leq z_{Cl} \leq 0.071$; and $z_F \leq 0.008$. Especially, $0.0565 \leq z_{Cl} \leq 0.064$; and $z_F \leq 0.00008$.

In a particularly preferred embodiment, the apatite of the fertilizer in the present invention is an agronutrient-substituted hydroxylapatite of the formula:

$$[Ca_{5-xm/2}K_{xK}Mg_{xMg}Fe_{xFe}Zn_{xZn}Mn_{xMn}Cu_{xCu}][(PO_4)_{3-yq/3}(CO_3)_{yC}(SiO_4)_{ySi}(MoO_4)_{yMo}(BO_3)_{yB}(SO_4)_{yS}][(OH)_{1-z}Cl_{zCl}F_{zF}]$$

wherein m is the molar average valence of the potassium, magnesium, iron, zinc, manganese and copper cations according to the equation:

$$m = (x_K + 2x_{Mg} + 2x_{Fe} + 2x_{Zn} + 2x_{Mn} + 2x_{Cu})/x$$

wherein q is the molar average valence of the anions $CO_3$, $SiO_4$, $MoO_4$, $BO_3$ and $SO_4$ according to the equation:

$$q = (2y_C + 4y_{Si} + 2y_{Mo} + 3y_B + 2y_S)/y$$

wherein $x = x_K + x_{Mg} + x_{Fe} + x_{Zn} + x_{Mn} + x_{Cu}$, $y = y_C + y_{Si} + y_{Mo} + y_B + y_S$, $z = z_{Cl} + z_F$, and at least one of x, $y_{Mo}$, $y_B$ and $y_S$ is greater than zero; and wherein $x_K \leq 0.21$; $x_{Mg} \leq 0.41$; $x_{Fe} \leq 0.14$; $x_{Zn} \leq 0.012$; $x_{Mn} \leq 0.044$; $x_{Cu} \leq 0.0038$; $y_C \leq 0.5$; $y_{Si} \leq 0.218$; $y_{Mo} \leq 0.000052$; $y_B \leq 0.0093$; $y_S \leq 0.25$; $z_{Cl} \leq 0.071$; and $z_F \leq 0.08$. Preferably, $0.051 \leq x_K \leq 0.205$; $0.165 \leq x_{Mg} \leq 0.412$; $0.0359 \leq x_{Fe} \leq 0.144$; $0.006 \leq x_{Zn} \leq 0.0123$; $0.018 \leq x_{Mn} \leq 0.044$; $0.0016 \leq x_{Cu} \leq 0.0038$; $0.00002 \leq y_{Mo} \leq 0.000042$; $0.00185 \leq y_B \leq 0.00741$; $0.125 \leq y_S \leq 0.25$; $0.0283 \leq z_{Cl} \leq 0.071$; and $z_F \leq 0.008$. Especially, $0.102 \leq x_K \leq 0.154$; $0.247 \leq x_{Mg} \leq 0.33$; $0.072 \leq x_{Fe} \leq 0.108$; $0.0061 \leq x_{Zn} \leq 0.0092$; $0.018 \leq x_{Mn} \leq 0.036$; $0.0025 \leq x_{Cu} \leq 0.0032$; $0.000021 \leq y_{Mo} \leq 0.0000313$; $0.0037 \leq y_B \leq 0.0056$; $0.157 \leq y_S \leq 0.219$; $0.0565 \leq z_{Cl} \leq 0.064$; and $z_F \leq 0.00008$.

In another embodiment, the present invention provides a horticultural method. In one step, a botanical species is planted in a sufficient amount of the fertilizer composition described above. In another step, the fertilizer is contacted with moisture to mobilize the agronutrients.

In a further embodiment, the present invention provides a method of making an active synthetic fertilizer. In one step, a synthetic apatite is prepared by admixing in an aqueous medium from about 1.0 to about 1.6 moles per liter of a soluble ionic calcium compound and a solution mixture comprising from about 0.5 to about 0.8 moles per liter of a soluble ionic phosphate compound and an agronomic amount of, one or more soluble agronutrients selected from magnesium, zinc, sulfur, chlorine, iron, manganese, copper, molybdenum and boron to form a crystalline calcium phosphate precipitate having agronutrients dispersed therein. The precipitate is recovered, dried and suitably granulated. As another step, individual zeolite portions are charged with ammonium and potassium cations to displace native cations. The precipitate is blended with the charged zeolites at a proportion of from about 5 to about 100 part by weight of the precipitate per 100 parts by weight of the ammonium and potassium charged zeolites. The weight ratio of ammonium charged zeolite to potassium charged zeolite is from about 1 to about 5:1. The zeolite is preferably clinoptilotite. The fertilizer blend preferably includes from 0 to about 10 parts by weight of a pH buffer per 100 parts by weight of the ammonium and potassium charged zeolites.

BRIEF DESCRIPTION OF THE FIGURE

The Figure shows diffractographs with peak spacing for three different synthetic apatite compositions of the present invention. The diffractographs indicate that the present synthetic apatite has a crystalline structure similar to naturally occurring hydroxyapatite and carbonate hydroxyapatite.

DETAILED DESCRIPTION OF THE INVENTION

An entire spectrum of essential agronomic nutrients including nitrogen, potassium, magnesium, sulfur and micronutrients are incorporated into an active synthetic soil for horticulture. Upon contact by moisture, the nutrients are slowly released, as required, for plant use. In addition, a fertilization rate can be controlled and the soil tailored to horticultural needs.

The major component of the synthetic soil composition is a synthetic apatite fertilizer. The apatite has a calcium phosphate matrix which is at least slightly soluble in water. Water solubility is necessary to give mobility to nutrient elements contained in the apatite matrix. Preferably, from about 30 to about 50 parts by weight phosphorus are used per 100 parts calcium, and more preferably, from about 40 to about 45 parts by weight phosphorus per 100 parts calcium.

One or more essential agronomic nutrients besides calcium and phosphorus are dispersed within the crystal structure of the synthetic apatite. Essential agronomic nutrients (agronutrients) in addition to calcium and phosphorus, include potassium, nitrogen, magnesium, sulfur, zinc, chlorine, iron, manganese, copper, molybdenum and boron. The latter seven elements (zinc, chlorine, iron, manganese, copper, molybdenum and boron) are generally referred to as micronutrients and are needed by plants in lower amounts than the other essential agronutrients.

Agronutrients are provided in the present composition as water soluble inorganic (ionic) compounds. The inorganic compounds should not have acute toxicity (e. g. cyanide salts), or other undesirable properties and should be free of excessive amounts of agrotoxins including unwanted elements and organic toxins. Undesirable elements typically include most heavy metals such as lead, cadmium, mercury, and the like, and other elements such as fluorine, sodium, arsenic, antimony, selenium, tin, and the like. The synthetic apatite can, however, contain a relatively small amount of any of these toxins below a toxic level for plants and, where appropriate, grazing animals. For example, natural apatite contains about 6 percent fluorine and has only limited potential as a soil supplement because of the fluorine toxicity, particularly to grazing animals such as sheep which can ingest the fluorine, e.g. by licking the soil containing the supplement. Prior art phosphatic fertilizers, in contrast, can contain about 3000 ppm fluorine, whereas natural soils average about 300 ppm and plants typically contain about 3 ppm fluorine. Thus, the present synthetic apatite composition should generally contain no more than 10 parts fluorine per 100 parts calcium, by weight, but preferably contains no more than 3000 ppm fluorine, more preferably no more than 300 ppm, and especially no more than 3 ppm. Tolerance levels of specific plants and animals for other agrotoxins can be found in the literature or determined empirically. The amount of agrotoxins in the synthetic apatite should be less than an amount which would result in release into the environment of the agrotoxins in excess of a given tolerance level.

Examples of suitable water soluble compounds of agronutrients used in the preparation of the synthetic apatite include potassium compounds such as potassium chloride, potassium nitrate, potassium nitrite, potassium sulfate, and potassium phosphate; magnesium compounds such as magnesium nitrate, magnesium chloride, magnesium nitrite, magnesium chlorate, magnesium perchlorate and hydrates thereof; sulfur compounds such as sodium sulfate, ammonium sulfate, potassium sulfate, and hydrates thereof; zinc compounds such as zinc chloride, zinc nitrate, zinc nitrite, zinc sulfate and hydrates thereof; chlorine compounds such as sodium chloride, potassium chloride, ammonium chloride; iron compounds such as ferric nitrate, ferrous nitrate, ferrous nitrite, ferric nitrite, ferric chloride, ferrous chloride, ferric sulfate, ferrous sulfate and hydrates thereof; manganese compounds such as manganese(II) nitrate, manganese(II) nitrite, manganese dichloride, manganese(II) sulfate and hydrates thereof; copper compounds such as copper(II) chloride, copper(III) chloride, copper(II) nitrate, copper(II) nitrite and hydrates thereof; molybdenum compounds such as ammonium paramolybdate, ammonium permolybdate, sodium trimolybdate, sodium tetramolybdate, sodium paramolybdate, sodium octamolybdate, potassium molybdate and hydrates thereof; and boron compounds such as sodium tetraborate, sodium metaborate, potassium tetraborate, potassium metaborate, ammonium tetraborate, hydrates thereof and orthoboric acid. The preferred, more preferred and optimum amounts of the agronomic nutrient elements per 100 parts calcium in the synthetic apatite, are set forth in Table 1.

TABLE 1

| Agronutrient Element | Preferred Amount (parts by Weight) | More Preferred Amount (parts by weight) | Optimum Amount (parts by weight) |
|---|---|---|---|
| Ca | 100 | 100 | 100 |
| P | 30–50 | 40–45 | 40–42 |
| K | 0–4 | 1–4 | 2–3 |
| Mg | 0–5 | 2–5 | 3–4 |

TABLE 1-continued

| Agronutrient Element | Preferred Amount (parts by Weight) | More Preferred Amount (parts by weight) | Optimum Amount (parts by weight) |
|---|---|---|---|
| S | 0–4 | 2–4 | 2.5–3.5 |
| Zn | 0–0.4 | 0.2–0.4 | 0.08–0.3 |
| Cl | 0–1.25 | 0.5–1.25 | 1.0–1.13 |
| Fe | 0–4 | 1–4 | 2–3 |
| Mn | 0–1.2 | 0.5–1.2 | 0.5–1 |
| Cu | 0–0.12 | 0.05–0.12 | 0.08–0.1 |
| Mo | 0–0.0025 | 0.001–0.002 | 0.001–0.0015 |
| B | 0–0.05 | 0.01–0.04 | 0.02–0.03 |

The synthetic apatite composition can also comprise a silicon and/or carbonate solubility control agent dispersed in the apatite matrix. The solubility control agent increases or decreases the water solubility and permits enhanced control over the rate at which nutrient elements are released. The effect of carbonate content on natural apatites is described in several publications including Caro, J., *Journal of Agricultural Food Chemistry*, 4:684–687, 1956; McClellan, G., *American Mineralogist*, 54:1374–1391, 1969; and Lehr R., *National Fertilizer Development Center Bulletin*, Y-43, Vol. 8 published by the Tennessee Valley Authority, Muscle Shoals, Alabama which are hereby incorporated herein by reference.

The solubility control agent is provided in the synthetic apatite composition as a water soluble inorganic or organic compound. Examples of suitable water soluble carbonate compounds include sodium carbonate, sodium bicarbonate, ammonium carbonate, ammonium bicarbonate, potassium carbonate and potassium bicarbonate. Examples of water soluble silicon compounds include inorganic silicates such as sodium silicate, sodium disilicate, sodium metasilicate, sodium orthosilicate, potassium disilicate, potassium metasilicate, potassium hydrogen disilicate, ammonium silicate, and hydrates thereof, and organic silicates such as ethyl orthosilicate and propyl orthosilicate.

A solubility control agent can comprise from 0 to about 15 parts by weight per 100 parts calcium. A carbonate agent is preferably used in an amount of 0 to about 15 parts by weight per 100 parts calcium, more preferably from about 2 to about 10 parts by weight and optimally from about 4 to about 6 parts by weight. A silicon agent is preferably used in an amount of 0 to about 10 parts by weight per 100 parts calcium, more preferably from about 2 to about 6 parts by weight and optimally from about 3 to about 5 parts by weight.

The present synthetic apatite composition can optionally include a binder agent to assist processing of the calcium phosphate into pellet form. Examples of such processing aid binders include calcium-lignosulfonate, cellulose, and the like. The binder comprises from 0 to about 10 percent by weight or more of the synthetic apatite.

The present synthetic apatite composition is the precipitated product of a water soluble calcium compound and a water soluble phosphate mixture comprising a water soluble phosphate compound and one or more water soluble agronutrients. The resulting product has nutrient elements incorporated into the structure of the calcium phosphate matrix.

The second component of the present synthetic soil is a cationic exchange medium saturated with a charge of exchange cations of one or more agronutrients. Suitable cationic exchange media have a cation exchange capacity (CEC) greater than about 50 $cmol_c/kg$. Cationic exchange media preferably have a CEC of at least about 100 $cmol_c/kg$, but more preferably at least about 150 $cmol_c/kg$. In addition, suitable cationic exchange media are substantially chemically inert, have low solublity in water and are essentially free of elements toxic to plant growth.

A most preferred class of suitable cationic exchange media are mineral zeolites. Zeolites as mentioned previously are hydrated aluminosilicates of alkali and alkaline-earth cations that possess infinite, three-dimensional crystal tetrahedral structures. Natural zeolites are a common mineral matter widely found in a relatively pure state. Synthetic zeolites have also been manufactured. Zeolites generally have a theoretical CEC of from about 200 $cmol_c/kg$ to about 600 $cmol_c/kg$ or more for some synthetically produced varieties.

Representative examples of common natural zeolites include clinoptilolite $(Na_3, K_3)\{Al_6Si_{30}O_{72}\}.24H_2O$, chabazite $(Na_2, Ca)_6\{Al_{12}Si_{24}O_{72}\}.40H_2O$, mordentite $Na_8\{Al_8Si_{30}O_{96}\}.24H_2)$, phillipsite $(Na,K)_5\{Al_5Si_{11}O_{32}\}.20H_2O$, and the like.

Representative examples of synthetic zeolites include Linde Type A $Na_{96}\{Al_{96}Si_{96}O_{384}\}.216H_2O$, Linde Type X $Na_{86}\{Al_{86}Si_{106}O_{384}\}.264H_2O$, and the like.

Due to desirable sand-like mechanical properties, a high degree of internal tunneling for favorable nutrient retention capacity and relative abundance in nature, a most preferred natural zeolite is clinoptilolite which is widely found in a relatively pure state. Clinoptilolite has been found to have good drainage and water holding characteristics, and a high theoretical cation exchange capacity of about 200 $cmol_c/kg$. Clinoptilolite also has a high affinity for $NH_4^+$ and the ability to hold the ion internally away from nitrifying bacteria. Hence nitrification rates are slow and the amount of leached N is low. Clinoptilolite is commercially available as sand-sized particles.

While zeolites are preferred cationic exchange media, other types can be used. Examples of other natural mineral exchange media are phyllosilicate clays such as vermiculite and smectite. Ion exchange resins can also be used though more expensive. For convenience of illustration, the cationic exchange medium will be referred to hereinbelow as the preferred but non-limiting zeolite embodiment.

The zeolite in the present synthetic soil is wholly or partially saturated with a charge of exchange cations of one or more agronomic nutrients so that existing native cations such as $Na^+$ are replaced with the desired agronutrient cations. Applicable agronutrients which can be charged on the zeolite generally include potassium, ammonium, manganese(II), zinc, iron(II), copper-(II), calcium and magnesium.

Selectivity (i. e. retention capacity) of exchange cations can vary depending on the type and variety of the cation exchange medium in question. However, as a rule of thumb, the adsorption selectivity in clinoptilolite favors monovalent exchange cations over divalent cations and among these, ion selectivity generally decreases with increasing ion hydration radius. For a clinoptilolite sample mined in the Wyoming region, selectivity for agronutrients and sodium was determined as follows: potassium > ammonium > > sodium > manganese(II) = copper(II) = iron(II) > zinc > calcium > magnesium.

In the practice of the present invention, the zeolite is preferably saturated with ammonium and potassium cations (totally replacing native cations) at a weight ratio of from about 1 to about 5:1 of ammonium:potassium. As used herein, agronomic nutrients saturated on the zeolite will be referred to by the preferred but non-limiting potassium and ammonium embodiment.

The present soil comprises from about 5 to about 100 parts of the synthetic apatite per 100 parts by weight of the $K^+$, $NH_4^+$ saturated zeolite A third optional but preferred component of the present soil composition is a pH buffer to maintain a soil pH in the range of from about 5.5 to about 7. Examples of suitable pH buffers include weak acids (e. g., humic acid). The pH buffer is used at from about 0 to about 10 parts per 100 parts by weight of the $K^+$, $NH_4^+$ saturated zeolite.

The synthetic apatite is conveniently made, for example, by preparing two or more aqueous stock solutions containing the appropriate compounds and mixing the stock solutions together. An inorganic replacement reaction occurs in the solution mixture to produce a precipitate. The precipitate can be recovered, e. g. by filtration, and dried.

A first stock solution is made by dissolving a suitable quantity of the water soluble calcium compound in a neutral or basic aqueous medium. Examples of suitable calcium compounds include calcium nitrate, calcium nitrite, calcium chloride, calcium chlorate, hydrates thereof, and the like. Calcium nitrate tetrahydrate is a preferred compound. The first solution preferably includes the calcium compound in an amount of from about 1.0 to about 1.6 moles per liter.

A second stock solution is prepared by dissolving a suitable quantity of the soluble phosphate compound and suitable quantities of the soluble anionic nutrient compound(s) in a neutral or basic aqueous medium. Examples of suitable soluble phosphate compounds include ammonium orthophosphate-mono , ammonium orthophosphate-di, ammonium orthophosphate, ammonium hypophosphate and the like. The second solution preferably includes the phosphate compound in an amount of from about 0.5 to about 0.8 moles per liter. The amount of anionic nutrient compound(s) in the second solution will depend on the desired concentration in the synthetic apatite end product which, in turn, will depend on the agronomic application. Generally, the second stock solution can include one or more anionic nutrient compounds each in an amount of from about 0.002 to about 0.4 moles per liter.

A third stock solution is prepared, where appropriate, by dissolving a suitable quantity of the soluble cationic nutrient compound(s) in a neutral or basic aqueous medium. The quantity of the cationic nutrient compound(s) in the third solution will again depend on the desired concentration in the synthetic apatite end product which, in turn, will depend on the agronomic application. Generally, the third solution includes one or more cationic nutrient compounds, each in an amount of from about 0.05 to about 5 moles per liter.

The optional silicon and/or carbonate solubility control agent can be added to the second (anionic) stock solution in an amount of from about 0.002 to about 0.4 moles per liter.

When preparing the above stock solutions, it is desirable to avoid mixing salts together which can undergo unwanted inorganic replacement reactions in the stock solutions. Therefore, ionic compounds having a desired component element in the anion are held in solution separately from ionic compounds having a desired component element in the cation. Liquid organic compounds (e. g. ethyl orthosilicate), however, can be added to any of the stock solutions or added separately before or after the stock solutions are mixed together.

A preferred basic aqueous medium comprises a solution of from about 18 to about 30 percent by weight of ammonium hydroxide in deionized water. A preferred neutral aqueous medium comprises deionized water.

Typically, the third stock solution is mixed with the second stock solution and the combined solution is then mixed with the first stock solution. The resulting mixture is then maintained at ordinary temperature and pressure for a sufficient time period for the crystalline precipitate to form.

The precipitate is recovered by ordinary means, such as, for example, by decanting the supernatant and filtering in a Büchner funnel. The precipitate is preferably washed with deionized water.

The washed precipitate can be dried at room temperature. Preferably, however the precipitate is dried at a temperature ranging from about 200° C. to about 600° C. for a time period of from about 2 to about 20 hours in drying equipment such as an oven, wherein the temperature is preferably boosted in steps of 200° C. after 2 hour intervals. The drying procedure can simultaneously dry the precipitate and dehydrate or partially dehydrate the calcium phosphate endproduct. Solubility is also partially dependent on the degree of hydration of the calcium phosphate crystals, i. e., crystal size and degree of crystallinity. Since solubility is reduced by dehydration, the drying procedure specified can be used to adjust the solubility of the final product. The actual drying procedure used is not particularly critical so long as care is exercised in obtaining the desired degree of dehydration. The dried precipitate is preferably cooled in a low humidity environment.

The precipitate can be crushed, granulated or pelletized by conventional means to produce a suitable particle size for use in soil treatment. Binding agents can be used to assist the formation of a relatively consistent granulation particle size and avoid the production of fines. Preferably, non-reactive binders are used.

As indicated above, the type of nutrient elements incorporated into the calcium phosphate crystal structure can vary from a single nutrient element to all seven micronutrients as well as potassium, sulfur and magnesium. The quantity of each nutrient element incorporated can be specified based on the agronomic factors involved.

Prior to use, native cations of the zeolite exchange medium are replaced with cations of agronutrients, preferably $NH_4^+$, $K^+$ as mentioned above. Various methods can be employed. Generally, zeolite particles having a size from about 50 $\mu$m to about 1000 $\mu$m are preferably divided into individual portions for each agronutrient used. Each portion is then preferably individually charged with the desired agronutrient until saturation. The agronutrient charge is conveniently provided by a sufficiently concentrated (e. g., 1 M) aqueous solution of an ionic compound such as a chloride, nitrate, sulfate, and the like of the agronutrient. Typically, the zeolite and nutrient solution are contacted at a suitable weight ratio, such as, for example, from about 2 to about 1:5 zeolite:nutrient solution. To ensure that the exchange sites of the zeolite are saturated with the agronutrient, the mixture is preferably agitated in a suitable vessel for a period of time such as 24 hours, the solution is decanted, and the zeolite is washed an additional two times with the appropriate solution. Afterward, the supernatant is decanted and the zeolite is washed with deionized water to remove excess nutrient solution. The wash supernatant can be tested with an indicator compound to determine the presence of excess solution in the zeolite. Silver nitrate, for example, is a good indicator for chloride ions.

After each portion of the zeolite is saturated with the desired agronutrient charge and excess solution is removed, the saturated zeolites are dried in an oven, for example, at a temperature on the order of 105° C. for a time period on the order of 24 hours. Once dried, the synthetic apatite and various saturated zeolite components can be dry blended in suitable equipment at a desired ratio.

When the instant synthetic soil comes in contact with moisture, nutrient elements become mobilized as the apatite is dissolved. As a first step, nutrients dispersed in the apatite matrix (magnesium, sulfur and micronutrients in addition to phosphorus and calcium) are slowly released as dissolution proceeds. Calcium ion production is adsorbed by the zeolite which acts as a $Ca^{2+}$ sink. Removal of $Ca^{2+}$ from the solution phase shifts the equilibrium towards increased apatite dissolution and phosphate fertilization in the soil. Adsorbed calcium ions compete with the $K^+$ and $NH^+$ ion charge at zeolite exchange sites causing the release of $K^+$ and $NH_4^+$ into the soil. The pH buffer maintains a mildly acidic soil pH to further assist the rate of apatite dissolution and nutrient release.

Desired apatite solubility and nutrient release rate are usually determined empirically based on type of plant being grown, growth cycle requirements, and the like agronomic factors.

The present fertilizing soil can be used in conventional agronomic applications by direct addition by conventional means to a suitably prepared field but is preferably used in horticultural applications such as zeoponics and hydroponics.

The present synthetic soil has potential for lunar applications since zeolite synthesis from minerals found on the moon is thought to be feasible. Furthermore, plant-essential elements occur in trace quantities in lunar rock and can be extracted.

To conduct a zeoponics culture, for example, a suitable greenhouse or culture environment has the present synthetic soil and fertilizer appropriately blended and spread to a sufficient depth to support the root structure of seedlings planted therein. The soil is kept moist to fertilize the plants.

The present invention is further illustrated by the following examples:

EXAMPLES 1-3

Three synthetic apatite compositions having nutrient elements incorporated into the crystalline structure were synthesized by an inorganic replacement reaction to simulate a naturally occurring hydroxyapatite mineral. Initially, three stock solutions (A, B and C) were prepared using laboratory reagent grade chemicals. Each reaction was run using 500 ml of stock solutions A and B and 20 ml of stock solution C. The composition of the solutions is shown in Table 2.

TABLE 2

| Compound | Concentration (grams) | | |
|---|---|---|---|
| | Example 1 | Example 2 | Example 3 |
| Solution A (0.5 liters 20 wt % NH$_4$OH in deionized water) | | | |
| Calcium nitrate tetrahydrate (Ca(NO$_3$)$_2$.4H$_2$O) | 141.52 | 141.52 | 141.52 |
| Solution B (0.5 liters 20 wt % NH$_4$OH in deionized water) | | | |
| Ammonium orthophosphate-mono ((NH$_4$)$_2$HPO$_4$) | 43.32 | 43.32 | 43.32 |
| Ammonium carbonate ((NH$_4$)CO$_3$) | 11.93 | 11.93 | — |
| Ammonium chloride ((NH$_4$)Cl) | 1.011 | 1.011 | 1.011 |
| Orthoboric acid (H$_3$BO$_4$) | 0.779 | 0.779 | 0.779 |
| Ammonium paramolybdate ((NH$_4$)$_6$Mo$_7$O$_{24}$.4H$_2$O) | 0.00098 | 0.00098 | 0.00098 |
| Ammonium sulfate ((NH$_4$)$_2$SO$_4$) | 2.4974 | 2.4974 | 2.4974 |
| Solution C (20 ml deionized water) | | | |
| Magnesium nitrate (Mg(NO$_3$)$_2$) | 13.499 | 3.374 | 12.972 |
| Iron(II) nitrate hexahydrate (Fe(NO$_3$)$_2$.6H$_2$O) | 3.627 | 3.627 | 3.627 |
| Manganese(II) sulfate monohydrate (MnSO$_4$.H$_2$O) | 0.5408 | 0.5408 | 0.5408 |
| Zinc nitrate (Zn(NO$_3$)$_2$) | 0.5652 | 0.5652 | 0.5652 |
| Copper(II) nitrate 2.5hydrate (Cu(NO$_3$)$_2$)—2.5H$_2$O) | 0.1464 | 0.1464 | 0.1464 |
| Other additive (ml) | | | |
| Ethyl orthosilicate | — | 5 | — |

After stock solutions A, B and C were prepared, solution C was quickly added to solution B and vigorously mixed for several seconds. This combined solution (B and C) was then added to solution A. In Example 2, the ethyl orthosilicate liquid was also added to solution A concurrently with solutions B and C. In all the examples the final mixture was vigorously stirred for 5 minutes and then allowed to stand for 18 hours to precipitate the calcium phosphate product. The clear supernatant was decanted and disposed of. The precipitate was washed 4 times with 3 liters of deionized water each washing. The precipitate was filtered using a Büchner funnel and Whatman #41 filter paper, and washed again with an additional 500 ml of deionized water. The precipitate was removed from the filter paper and placed into a glass beaker for drying. The precipitate was dried in an oven at 200° C. for 17 hours, lightly crushed in an agate mortar and stored in a desiccator.

The three synthetic materials were characterized by powder x-ray diffraction and by electron microprobe analysis. The Figure shows diffractographs of the compositions. The peaks (d-spacing) correspond to peaks for natural hydroxyapatites. Peak width was narrow suggesting that individual crystals have a width of from about 200–500 angstroms. The chemical analysis of the composition is shown in Table 3.

TABLE 3

| Component | Fraction (%) | | |
|---|---|---|---|
| | Example 1 | Example 2 | Example 3 |
| Na$_2$O | 0 | 0 | 0 |
| K$_2$O | 0 | 0 | 0 |
| SO$_3$ | 0.439 | 0.139 | 2.584 |
| CaO | 46.165 | 47.789 | 45.211 |
| P$_2$O$_5$ | 33.461 | 35.205 | 36.116 |
| Fe$_2$O$_3$ | 1.001 | 1.217 | 1.175 |
| MgO | 2.839 | 0.700 | 2.562 |
| SiO$_2$ | — | 0.9838 | — |
| OH | 3.163 | 3.265 | 3.401 |
| CO$_3$ | 6.7 | 5.7 | — |
| Mn | 2028 ppm | 2468 ppm | 2635 ppm |
| Cu | 38 ppm | 75 ppm | 79 ppm |
| Cl | 350 ppm | 140 ppm | 100 ppm |
| Zn | 303 ppm | 849 ppm | 587 ppm |
| MoO$_3$ | 4 ppm | 53 ppm | 0 |
| BO$_3$ | 1237 ppm | 768 ppm | 1716 ppm |

EXAMPLES 4–12

In the following examples, the apatite compositions prepared in Examples 1–3 were contacted with deionized water to determine the equilibrium ion concentration after dissolution. At the end of each run, pH and the ion concentrations of the various elements were measured. Concentrations of manganese, iron, copper and zinc ions were determined using DTPA chelating agent (pH=7.3). The procedure consisted of placing a 0.5 g sample of the synthetic apatite composition in a covered glass bottle containing 80 ml of deionized water. The bottles and samples were placed in an environmentally controlled reciprocal shaker at a setting of 100 rpm and shaken for hours. The temperature was held at 25° C.. Results are given in Table 4.

TABLE 4

| Ex. No. | Sample | pH | Element Concentration | | | | | | | | | | |
|---|---|---|---|---|---|---|---|---|---|---|---|---|---|
| | | | mg/L | | | | mg/kg | | | | mg/L | | |
| | | | P | Ca | Mg | S | Mn* | Fe* | Cu* | Zn* | B | Mo | Cl |
| 4 | 1 | 8.70 | 1.33 | 13.6 | 29.8 | 5.6 | 121 | 244 | 6 | 31 | 4.4 | <0.02 | 0.6 |
| 5 | 1 | 8.70 | 1.30 | 13.6 | 38.8 | 6.0 | 118 | 249 | 6 | 29 | 4.4 | <0.02 | 1.7 |
| 6 | 1 | 8.70 | 1.30 | 13.5 | 39.6 | 5.8 | 118 | 250 | 6 | 29 | 4.3 | <0.02 | 1.1 |
| 7 | 2 | 8.13 | 0.17 | 15.2 | 3.68 | 2.4 | 152 | 250 | 7 | 56 | 1.9 | <0.02 | 2.3 |
| 8 | 2 | 8.16 | 0.22 | 14.8 | 3.27 | 2.7 | 163 | 302 | 7 | 59 | 1.9 | <0.02 | 1.6 |
| 9 | 2 | 8.16 | 0.17 | 14.1 | 3.22 | 2.3 | 152 | 246 | 7 | 56 | 1.9 | <0.02 | 3.1 |
| 10 | 3 | 7.00 | 2.95 | 10.3 | 2.67 | 17.8 | 160 | 402 | 10 | 57 | 0.8 | <0.02 | 0.4 |
| 11 | 3 | 6.95 | 3.80 | 10.3 | 2.75 | 17.6 | 158 | 406 | 10 | 55 | 0.8 | <0.02 | 0.4 |
| 12 | 3 | 7.12 | 3.45 | 10.0 | 2.71 | 17.6 | 158 | 408 | 10 | 55 | 0.8 | <0.02 | 0.5 |

*DTPA extractable, pH = 7.3.

EXAMPLE 13

In the following example, wheat is grown in a synthetic soil comprising a mixture of the Example 3 synthetic apatite, a natural clinoptilolite zeolite saturated with a charge of ammonium and potassium cations and a humic acid buffer. To prepare the clinoptilolite, a 3 to 1 division is initially made. The larger portion is loaded into an ion exchange column having a reservoir containing a 1M aqueous solution of NH$_4$Cl. Passing the NH$_4$Cl solution through the column saturates the clinoptilolite with ammonium ions. Excess NH$_4$Cl solution is washed away using deionized water until the supernatant wash liquid does not turn a silver nitrate indicator solution cloudy. The ammonium-clinoptilolite is then removed from the column and dried in an oven at 105° C. over a 24 hour period. The smaller portion of clinoptilolite is similarly prepared except that the charging compound is a 1M KCl solution passed though the column. The potassium-clinoptilolite is similarly washed and dried. After cooling the present synthetic soil is prepared by mixing, 75 parts ammonium-clinoptilolite with 25 parts potassium-clinoptilolite, 20 parts apatite and 10 parts pH buffer. Wheat seeds are then grown in the synthetic soil.

The foregoing description of the soil composition and horticultural method is illustrative and explanatory thereof. Various changes in the materials, particular components and steps employed will occur to those skilled in the art. It is intended that all such variations within the scope and spirit of the appended claims be embraced thereby.

What is claimed is:

1. A method for preparing an active synthetic fertilizer, comprising the steps of:
   (1) preparing an aqueous calcium solution from a soluble ionic calcium compound;
   (2) preparing an aqueous phosphate solution from a soluble ionic phosphate compound, optionally with an anionic agronutrient selected from sulfate, chloride, molybdate, borate, and combinations thereof, from a soluble ionic compound containing the anionic agronutrient;
   (3) optionally preparing an aqueous solution of cationic agronutrients selected from potassium, magnesium, zinc, iron, manganese, copper, and combinations thereof, from a soluble ionic compound containing the cationic agronutrient;
   (4) mixing together the calcium solution, the phosphate solution and the cationic agronutrient solution, if prepared, and forming an apatite precipitate by inorganic replacement reaction;
   (5) recovering the precipitate with a crystalline hydroxylapatite structure having at least one agronutrient structurally dispersed therein selected from sulfate, chloride, molybdate, borate, potassium, magnesium, zinc, iron, manganese, copper, or a combination thereof;
   (6) exchanging ammonium and potassium cations onto a cationic exchange medium; and
   (7) blending from about 5 to about 100 parts by weight of the precipitate from step (5) with 100 parts by weight of the cationic exchange medium from step (6).

2. A fertilizer, comprising:
   an admixture of agronutrient-substituted hydroxylapatite and cationic exchange medium obtained as the product from the blending step of claim 1.

3. The fertilizer of claim 2, further comprising a pH buffer.

4. The fertilizer of claim 3, wherein said buffer maintains a soil pH of from about 5.5 to about 7.

5. The fertilizer of claim 2, wherein the cationic exchange medium comprises natural or synthetic zeolite, phyllosilicate or a combination thereof.

6. The fertilizer of claim 2, wherein the cationic exchange medium is selected from clinoptilolite, chabazite, mordenite, phillipsite, Linde type A, Linde type X, vermiculite, smectite or a combination thereof.

7. The fertilizer of claim 2, wherein said cationic exchange medium has a cation exchange capacity of at least 50 cmol$_c$/kg.

8. The fertilizer of claim 2, wherein said cationic exchange medium has a cation exchange capacity of at least 100 cmol$_c$/kg.

9. The fertilizer of claim 2, wherein said cationic exchange medium has a cation exchange capacity of at least 150 cmol$_c$/kg.

10. The fertilizer of claim 2, wherein the agronutrients in the cation exchange medium comprise ammonium and potassium at a weight ratio of from about 1 to about 5:1 of ammonium:potassium.

11. The fertilizer of claim 2, wherein said hydroxylapatite precipitate has dispersed therein, per 100 parts by weight calcium, up to about 4 parts potassium, up to about 5 parts magnesium, up to about 4 parts sulfur, up to about 0.4 parts zinc, up to about 1.25 parts chlorine, up to about 4 parts iron, up to about 1.2 parts manganese, up to about 0.12 parts copper, up to about 0.0025 parts molybdenum, up to about 0.05 parts boron, and less than about 10 parts fluorine and wherein the cationic exchange medium comprises zeolite saturated with a charge of potassium and ammonium at a weight ratio of from about 1 to about 5:1 of ammonium:potassium.

12. The fertilizer of claim 11, further including from 0 to about 10 parts by weight of a pH buffer per 100 parts by weight of the ammonium and potassium charged zeolite.

13. The method of claim 1, wherein the charging step comprises contacting a first particulated zeolite portion with said ammonium cations, and contacting a second particulated zeolite portion with said potassium cations, and further comprising mixing said first and second zeolite portions to form a zeolite mixture having a weight ratio of ammonium charged zeolite to potassium charged zeolite from about 1:1 to about 5:1.

14. The method of claim 1, further comprising blending from 0 to about 10 parts by weight of a pH buffer with said zeolite and precipitate.

15. The method of claim 1, wherein the cationic agronutrient solution is prepared, and wherein the mixing step comprises sequentially mixing the phosphate solution with the cationic agronutrient solution and then mixing the resulting phosphate-agronutrient solution with the calcium solution.

16. The method of claim 1, wherein the cationic agronutrient solution is prepared, the calcium solution comprises from about 1.0 to about 1.6 moles per liter calcium, the phosphate solution comprises from about 0.5 to about 0.8 moles per liter phosphate and from about 0.002 to about 0.4 moles per liter of sulfate, molybdate, borate, or a combination thereof, and the cationic agronutrient solution comprises from about 0.05 to about 5 moles per liter of potassium, magnesium, zinc, iron, manganese, copper, or a combination thereof.

17. The method of claim 1, wherein the cationic agronutrient solution is prepared, the calcium solution comprises 1.0–1.6 molar calcium, the phosphate solution comprises 0.5–0.8 molar phosphate and 0.002–0.4 molar sulfate, chloride, molybdate, and borate, and the cationic agronutrient solution comprises 0.05–5 molar potassium, magnesium, zinc, iron, manganese and copper.

18. The method of claim 1, comprising dehydrating the precipitate at a temperature from about 200° C. to about 600° C. to control the solubility of the synthetic apatite.

19. An active synthetic soil, consisting essentially of an admixture of:
  a cationic exchange medium saturated with a charge of ammonium and potassium at a weight ratio of ammonium:potassium of from about 1:1 to about 5:1; and
  an agronutrient-substituted hydroxylapatite;
  wherein the hydroxylapatite has an overall composition according to the formula:

$$(Ca_{5-xm/2}M_x)(PO_4)_{3-yq/3}Q_y)((OH)_{1-z}X_z)$$

wherein M is a cation containing an element selected from potassium, zinc, iron, manganese, magnesium, or copper, or a combination thereof;
  wherein m is the molar average valence of M according to the equation $m=(\Sigma m_i x_i)/\Sigma x_i)$ where each $m_i$ is the valence of an ith cation comprising M and $x_i$ is the relative molar proportion of the ith cation;
  wherein Q is an anion of carbonate, silicate or containing an element selected from boron, molybdenum, or sulfur, or a combination thereof;
  wherein q is the molar average valence of Q according to the equation $q=(\Sigma q_i y_i)/(\Sigma y_i)$ where each $q_i$ is the valence of an ith anion comprising Q and $y_i$ is the relative molar proportion of the ith anion;
  wherein X is chloride, fluoride or a combination thereof; and
  wherein x has a value of 0–0.82 and y has a value of 0–0.76, provided that at least one of x and y are greater than zero and when x is zero Q includes an anion of sulfur, boron or molybdenum, or a combination thereof.

20. A horticultural method, comprising the steps of:
  planting a botanical species in a sufficient amount of the synthetic soil of claim 19; and
  contacting the soil with moisture to mobilize the agronutrients.

21. An active synthetic soil, comprising in admixture:
  an agronutrient-substituted hydroxylapatite; and
  a cationic exchange medium saturated with a charge of ammonium and potassium at a weight ratio of ammonium:potassium of from about 1:1 to about 5:1;
  wherein the hydroxylapatite has a generally uniform composition according to the formula:

$$(Ca_{5-xm/2}M_x)((PO_4)_{3-yq/3} Q_y)((OH)_{1-z}X_z)$$

wherein M is a cation containing an element selected from potassium, zinc, iron, manganese, magnesium, or copper, or a combination thereof;
  wherein m is the molar average valence of M according to the equation $m=(\Sigma m_i x_i)/(\Sigma x_i)$ where each $m_i$ is the valence of an ith cation comprising M and $x_i$ is the relative molar proportion of ith cation;
  wherein Q is an anion of carbonate, silicate or containing an element selected from boron, molybdenum, or sulfur, or a combination thereof;
  wherein q is the molar average valence of Q according to the equation $q=(\Sigma q_i y_i)/(\Sigma y_i)$ where each $q_i$ is the valence of ith anion comprising Q and $y_i$ is the relative molar proportion of the ith anion;
  wherein X is chloride, fluoride or a combination thereof; and
  wherein x has a value of 0–0.82, y has a value of 0–0.76, and z has a value of 0–0.15, provided that at least one of x and y are greater than zero and the amount of fluoride does not exceed 3000 ppm by weight, and when x is zero Q includes an anion of sulfur, boron or molybdenum, or a combination thereof.

22. A horticultural method, comprising the steps of:
  planting a botanical species in a sufficient amount of the soil of claim 21; and
  contacting the soil with moisture to mobilize the agronutrients.

23. The soil of claim 21, wherein $M_x$ has the formula:

$$K_{x_K}Mg_{x_{Mg}}Fe_{x_{Fe}}Zn_{x_{Zn}}Mn_{x_{Mn}}Cu_{x_{Cu}}$$

wherein:
  $x_K \leq 0.205$;
  $x_{Mg} \leq 0.412$;
  $x_{Fe} \leq 0.144$;
  $x_{Zn} \leq 0.0123$;
  $x_{Mn} \leq 0.044$;
  $x_{Cu} \leq 0.0038$;
  $x = x_K + x_{Mg} + x_{Fe} + x_{Zn} + x_{Mn} + x_{Cu}$; and
  $x > 0$.

24. The soil of claim 23, wherein:
  $0.102 \leq x_K \leq 0.154$;
  $0.247 \leq x_{Mg} \leq 0.33$;
  $0.072 \leq x_{Fe} \leq 0.108$;
  $0.0061 \leq x_{Zn} \leq 0.0092$;
  $0.018 \leq x_{Mn} \leq 0.036$; and
  $0.0025 \leq x_{Cu} \leq 0.0032$.

25. The soil of claim 23, wherein:
  $0.051 \leq x_K \leq 0.205$;
  $0.165 \leq x_{Mg} \leq 0.412$;
  $0.0359 \leq x_{Fe} \leq 0.144$;
  $0.006 \leq x_{Zn} \leq 0.0123$;
  $0.018 \leq x_{Mn} \leq 0.044$; and
  $0.0016 \leq x_{Cu} \leq 0.0038$.

26. The soil of claim 21, wherein $Q_y$ has the formula:

$$(CO_3)_{y_C}(SiO_4)_{y_{Si}}(MoO_4)_{y_{Mo}}(BO_3)_{y_B}(SO_4)_{y_S}$$

wherein $y_C$ has a value up to about 0.5, $y_{Si}$ has a value up to about 0.218, $y_{Mo}$ has a value up to about 0.000052, $y_B$ has a value up to about 0.0093, $y_S$ has a value up to about 0.25; and
wherein $y = y_C + y_{Si} + y_{Mo} + y_B + y_S$, and $(y_{Mo} + y_B + y_S) > 0$.

27. The soil of claim 26, wherein:
  $0.00002 \leq y_{Mo} \leq 0.000042$;
  $0.00185 \leq y_B \leq 0.00741$; and
  $0.125 \leq y_S \leq 0.25$.

28. The soil of claim 27, wherein:
  $0.0668 \leq y_C \leq 0.334$; or
  $0.0435 \leq y_{Si} \leq 0.131$.

29. The soil of claim 26, wherein:
  $0.000021 \leq y_{Mo} \leq 0.0000313$;
  $0.0037 \leq y_B \leq 0.0056$; and
  $0.156 \leq y_S \leq 0.219$.

30. The soil of claim 29, wherein:
  $0.134 \leq y_C \leq 0.2$; or
  $0.0653 \leq y_{Si} \leq 0.109$.

31. The soil of claim 27, wherein $x_z$ has the formula:

$$Cl_{z_{Cl}}F_{z_F}$$

wherein $z_{Cl}$ has a value up to about 0.071, $z_F$ has a value less than about 0.08, and $z = z_{Cl} + z_F$.

32. The soil of claim 31; wherein:
  $0.0283 \leq z_{Cl} \leq 0.071$; and $z_F \leq 0.008$.

33. The soil of claim 31, wherein:
$0.0565 \leq z_{Cl} \leq 0.064$; and
$z_F \leq 0.00008$.

34. The soil of claim 21, herein the hydroxylapatite has the formula:

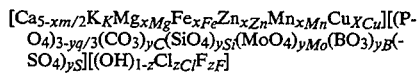
$[Ca_{5-xm/2}K_KMg_{xMg}Fe_{xFe}Zn_{xZn}Mn_{xMn}Cu_{xCu}][(PO_4)_{3-yq/3}(CO_3)_{yC}(SiO_4)_{ySi}(MoO_4)_{yMo}(BO_3)_{yB}(SO_4)_{yS}][(OH)_{1-z}Cl_{zCl}F_{zF}]$ wherein m is the molar average valence of the potassium, magnesium, iron, zinc, manganese and copper cations according to the equation:

$m = (x_K + 2x_{Mg} + 2x_{Fe} + 2x_{Zn} + 2x_{Mn} + 2x_{Cu})/x$ wherein q is the molar average valence of the anions $CO_3$, $SiO_4$, $MoO_4$, $BO_3$ and $SO_4$ according to the equation:

$q = (2y_C + 4y_{Si} + 2y_{Mo} + 3y_B + 2y_S)/y$ wherein $x = x_K + x_{Mg} + x_{Fe} + x_{Zn} + x_{Mn} + x_{Cu}$, $y = y_C + y_{Si} + y_{Mo} + y_B + y_S$, $z = z_{Cl} + z_F$, and at least one of x, $y_{Mo}$, $y_B$ and $y_S$ is greater than zero; and wherein:
$x_K \leq 0.21$;
$x_{Mg} \leq 0.41$;
$x_{Fe} \leq 0.14$;
$x_{Zn} \leq 0.012$;
$x_{Mn} \leq 0.044$;
$x_{Cu} \leq 0.0038$;
$y_C \leq 0.5$;
$y_{Si} \leq 0.218$;
$y_{Mo} \leq 0.000052$;
$y_B \leq 0.0093$;
$y_S \leq 0.25$;
$z_{Cl} \leq 0.071$; and
$z_F \leq 0.08$.

35. The soil of claim 34, wherein:
$0.051 \leq x_K \leq 0.205$;
$0.165 \leq x_{Mg} \leq 0.412$;
$0.0359 \leq x_{Fe} \leq 0.144$;
$0.006 \leq x_{Zn} \leq 0.0123$;
$0.018 \leq x_{Mn} \leq 0.044$;
$0.0016 \leq x_{Cu} \leq 0.0038$;
$0.00002 \leq y_{Mo} \leq 0.000042$;
$0.00185 \leq y_B \leq 0.00741$;
$0.125 \leq y_S \leq 0.25$;
$0.0283 \leq z_{Cl} \leq 0.071$; and
$z_F \leq 0.008$.

36. The soil of claim 35, wherein:
$0.0668 \leq y_C \leq 0.334$; or
$0.0435 \leq y_{Si} \leq 0.131$.

37. The soil of claim 34, wherein:
$0.102 \leq x_K \leq 0.154$;
$0.247 \leq x_{Mg} \leq 0.33$;
$0.072 \leq x_{Fe} \leq 0.108$;
$0.006 \leq x_{Zn} \leq 0.009$;
$0.018 \leq x_{Mn} \leq 0.036$;
$0.0025 \leq x_{Cu} \leq 0.0032$;
$0.000021 \leq y_{Mo} \leq 0.0000313$;
$0.0037 \leq y_B \leq 0.0056$;
$0.157 \leq y_S \leq 0.219$;
$0.0565 \leq z_{Cl} \leq 0.064$; and
$z_F \leq 0.00008$.

38. The soil of claim 37, wherein:
$0.134 \leq y_C \leq 0.2$; or
$0.0653 \leq y_{Si} \leq 0.109$.

* * * * *